Nov. 3, 1931.                    W. B. VAN WERT                    1,830,378
                                    CAMP BED
                       Filed Dec. 31, 1929        3 Sheets-Sheet 1
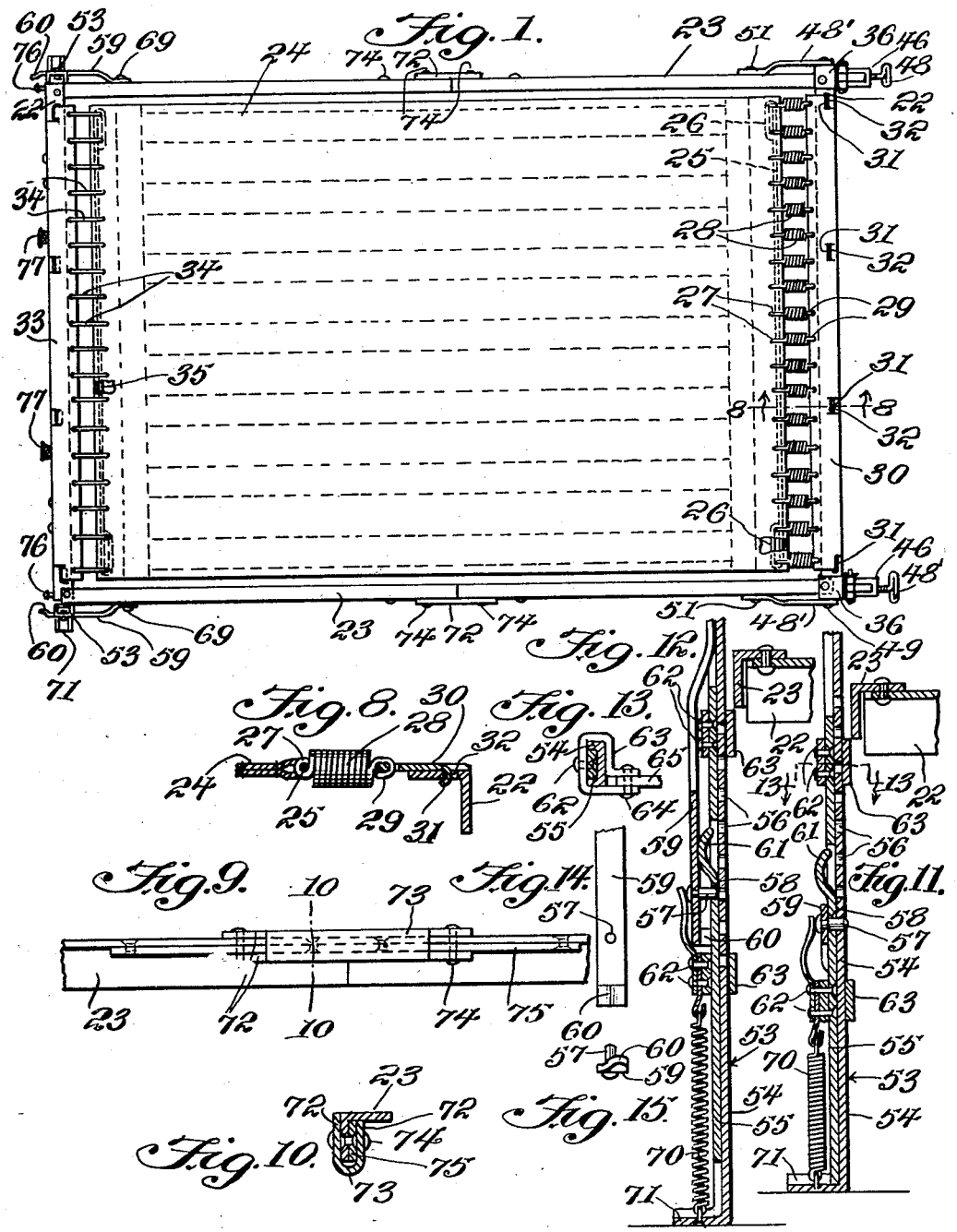
W. B. Van Wert
INVENTOR
BY Victor J. Evans
ATTORNEY
WITNESS J. T. L. Wright

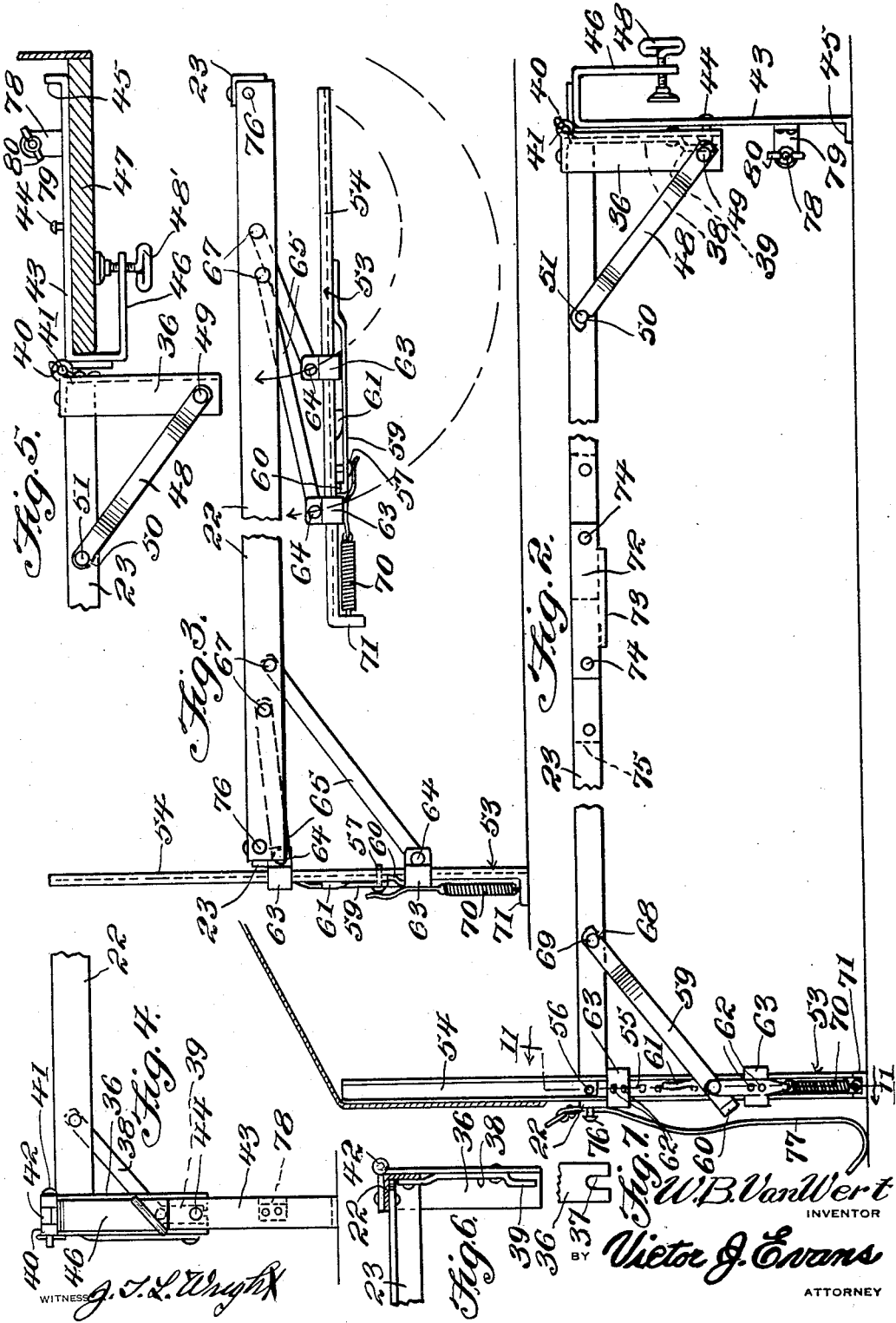

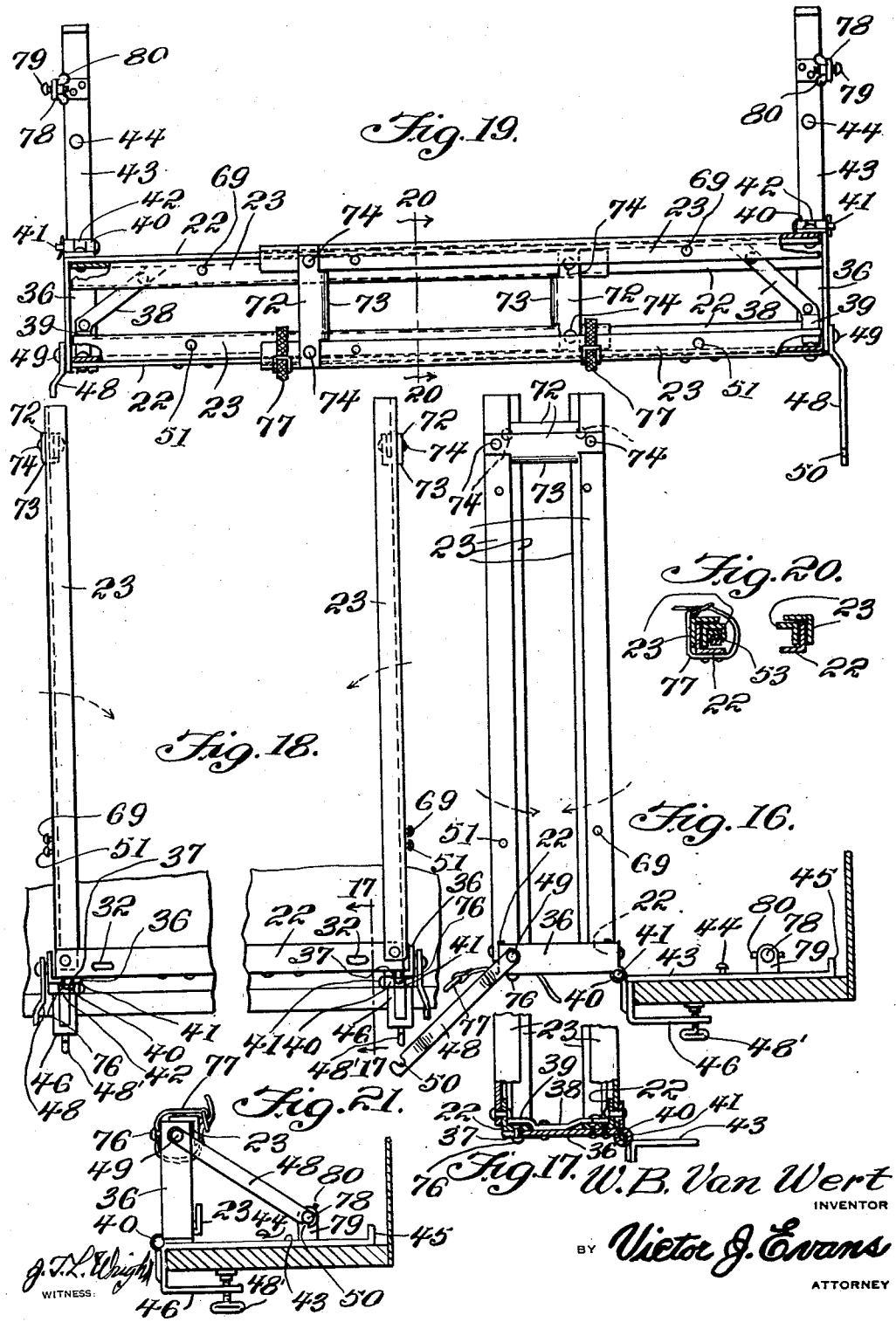

Patented Nov. 3, 1931

1,830,378

UNITED STATES PATENT OFFICE

WILLIAM B. VAN WERT, OF PECKVILLE, PENNSYLVANIA

CAMP BED

Application filed December 31, 1929. Serial No. 417,735.

This invention relates to folding beds designed for use in camps, the bed being especially adapted for the use of automobile tourists.

An object of the present invention is the provision of a bed of the above character which may be used in connection with or independently of an automobile, and when not in use, may be compactly folded for storage or transportation.

Another object of the invention is the provision of a camper's bed which may be attached to the running board of an automobile and extended for use, or may be folded and arranged along the outer edge of the running board to provide a luggage carrier.

With the above and other objects in view, the invention further includes the following novel features and details of construction, to be hereinafter more fully described, illustrated in the accompanying drawings and pointed out in the appended claims.

In the drawings:—

Figure 1 is a plan view showing the bed extended for use.

Figure 2 is a side view with parts broken away.

Figure 3 is an end view illustrating the manner of folding the legs at the outer end of the bed.

Figure 4 is a fragmentary view showing one corner of the inner end of the bed.

Figure 5 is a fragmentary view illustrating the manner of attaching the bed to an automobile running board, the latter being shown in section.

Figure 6 is a detail sectional view taken through one of the end rails.

Figure 7 is a fragmentary elevation of a portion of the inner end of the bed.

Figure 8 is an enlarged fragmentary section taken on the line 8—8 of Figure 1.

Figure 9 is an enlarged bottom plan view showing the foldable connection between the sections of the side rails.

Figure 10 is a section on the line 10—10 of Figure 9.

Figure 11 is an enlarged sectional view on the line 11—11 of Figure 2.

Figure 12 is a similar view illustrating the manner of adjusting the outer legs of the bed.

Figure 13 is a section on the line 13—13 of Figure 11.

Figure 14 is a fragmentary elevation of the brace bar shown in Figures 11 and 12.

Figure 15 is an end view of the same.

Figure 16 is a view showing the frame of the bed partly folded.

Figure 17 is a sectional view on the line 17—17 of Figure 18.

Figure 18 is an elevation at right angles to Figure 16 with parts broken away.

Figure 19 is a top plan view with the parts in position shown in Figures 16, 17 and 18, parts being broken away and shown in section.

Figure 20 is a section on the line 20—20 of Figure 19.

Figure 21 is an end view with the frame of the bed arranged to provide a luggage carrier, the running board being shown in section.

Referring to the drawings in detail wherein like characters of reference denote corresponding parts, the frame of the bed as shown comprises end rails 22 and sectional side rails 23. These rails are formed of angle iron and provide a rectangular frame within which is stretched a canvas or other fabric 24. For this purpose, the fabric 24 has extending transversely along opposite ends rods 25, whose ends are looped as shown at 26. The canvas 24 is provided with spaced openings to receive eyes 27 at one end of springs 28, the eyes receiving the rods 25 so as to provide a strong and durable connection between the canvas and the springs. Eyes 29 at the other end of the springs pass through openings provided in a plate 30, and this plate is provided with spaced hooks 31 which are removably received within openings 32 provided in the rail 22 at the inner end of the frame.

A similar plate 33 is attached to the other end of the canvas 24 by means of loops or links 34. One end of these links are attached to the plate 33 while the opposite ends engage around a rod 35 similar to the rod 25. The canvas 24 is thus removably and yieldingly attached to the opposite ends of the frame.

Extending downwardly from opposite sides at the inner end of the frame are rigid angle irons 36, the lower ends of which are notched as at 37. Plates 38 are secured within these angle irons and their lower ends 39 are spaced from the angle irons as clearly shown in Figure 6 of the drawings. Eyes 42 extend from the upper corners of the inner end rail 22 and these eyes receive removable pins 41 which also extend through eyes 42 carried by bars 43.

These bars form legs for the inner end of the bed frame and carry headed studs 44 which are received within the notches 37 at the lower ends of the angle irons 36. The lower ends of the bars 43 are extended to provide feet 45, while the upper ends carry angular extensions 46 to receive the outer edge of an automobile running board 47. The clamping screw 48' provides means for clamping engagement with the running board as shown in Figure 5 of the drawings.

With the parts arranged as shown in Figure 2 the inner end of the bed frame is supported by the bars 43, the latter forming legs for the frame. By removing the pins 41 and reversing the bar 43, the latter may be arranged transversely of the upper face of the running board as shown in Figure 5 of the drawings. The pin 41 thus not only provides a hinge connection between the bar 43 and the bed frame with the parts arranged as shown in Figure 5, but also provides means to hold the headed stud 44 within the notch 37 and prevent outward swinging movement of the bars 43 when the latter are utilized as legs. A brace 48 has one of its ends pivotally secured to the extension 36 as shown at 49, while its opposite end is notched as shown at 50 for removable engagement with a headed stud 51 which extends from one of the side rails 23. The other side rail 23 and extension 36 are similarly braced. Braces 38 connect the extensions 36 and end rails 22, as shown in Figure 4 of the drawings.

The outer end of the bed is supported by legs 53. These legs are of sectional formation and comprise channel bars 54 within which are slidingly mounted bars 55. The channel bars 54 are provided with spaced openings 56 for the reception of locking pins 57 which pass through these openings and through an opening 58 provided in the bar 55.

The pin 57 is carried by a brace bar 59 and this bar carries at one end a cam 60. The bar 55 has extending therefrom a curved tongue or cam 61 which is arranged in the path of movement of the bar 59 for a purpose to be presently explained.

Extending around the bar 55 and the channel bar 54 and secured to the former as shown at 62 are yokes 63. These yokes have pivotal connection as shown at 64 with the outer ends of arms 65. These arms are of different lengths and are pivotally secured to the side rails 23 as shown at 67. As the yokes 63 are slidable upon the channel bars 54 and are attached to the bars 55 which slide within the channel bar, the outer end of the bed frame may be vertically adjusted in accordance with the height of the running board of an automobile.

When the bed is in position for use, the bar 59 is arranged to provide a brace which connects the outer legs with the bed frame and for this purpose, one end of the bar 59 is notched as shown at 68 for engagement over a headed pin 69, one of which is provided upon each side of the frame. Springs 70 connect the lower yokes 63 of the legs 53 with feet 71 at the lower ends of the angle bars 54. These springs act to draw the sliding bars 55 downward, while the pins 57 lock these bars against movement in either direction.

The side rails 23 of the bed are, as stated, of sectional formation, and these sections are hingedly connected by means of double links 72. These double links 72 are connected by a web 73 as shown in Figures 9 and 10 of the drawings, while pivot pins 74 extend through the links and through reinforcing plates 75 and the adjacent ends of the rail sections. These side rail sections may thus be swung pivotally upward, downward pivotal movement being limited by the abutted ends of the side rail sections and the web 73, which connect the links 72. It may be here stated that the links 72, as well as the web 73 upon one side of the bed are relatively short, so that when the side rail sections are extended upward as shown in Figure 16 of the drawings, the side rail sections at one side of the bed will be closer than the side rail sections at the opposite side.

Assuming that the bed in its extended position is attached to the running board of an automobile, in order to fold the bed, the bars 59 are disengaged from the studs 69, whereupon the legs 53 may be swung relatively inward as shown in Figure 3 of the drawings, both of the legs with the brace bars 65 swinging upward within the angular end rails 22. The side rails 23 are then swung upward in parallel relation as shown in Figure 16, with the outer ends of the outer sections of these side rails arranged within the outer ends of the angular extensions 36, one of the flanges of the outer end rail 22 sliding within the space between the extension 22 and the spaced ends of the plates 39.

Headed studs 76 which project from the outer end rail 22, enter the notches 37. The parallel sections of the side rails are then folded inwardly and downwardly as indicated by the arrows in Figure 18 of the drawings, and as the side rail sections upon one side of the frame are spaced further apart than the side rail sections upon the other side of the frame, the sections of one side rail will fold within the sections of the other side rail, as shown in Figure 19 of the drawings. Straps 77 are then secured around the folded outer rail sections and the sections are swung pivotally upward to the position shown in Figure 21 of the drawings. When in this position, the brace bars 48 have their notched ends engaged over headed screws 78 which are carried by brackets 79 extending from the bars 43. The braces 48 are clamped in position by means of wing nuts 80. The frame in its folded condition will thus extend vertically along the outer edge of the running board and provide a luggage carrier.

By disengaging the bars 59 from the headed studs 69 and swinging these bars inward parallel with the legs 53, the pins 57 may be withdrawn from the openings 56 so that the bar 59 which carries the yoke 63 may be vertically adjusted to adjust the height of the outer end of the bed. This disengagement of the pins 57 from the openings 56 is due to the bar 59 riding upon the cam 61 and the cam 60 riding upon the face of the bar 55.

The invention is susceptible of various changes in its form, proportions and minor details of construction and the right is herein reserved to make such changes as properly fall within the scope of the appended claims.

Having described the invention what is claimed is:—

1. In a folding bed, a frame including end rails, sectional side rails, supporting legs, means to fold the sections of one side rail within the sections of the other side rail, means to fold the side rail sections between the end rails, means to hingedly secure certain of the legs to one end of the frame, and means to fold the legs at the other end of the frame within one of the end rails.

2. In a folding bed for automobiles, a frame including end rails, sectional side rails, means connecting the side rail sections to fold the latter within the end rails in spaced parallel relation, with the sections of one side rail folded within the sections of the other side rail, means to removably secure one end of the frame to the running board of an automobile, whereby the frame may be arranged horizontally in extended position to provide a bed and vertically in folded position to provide a luggage carrier, and means to support the outer end of the bed.

3. In a folding bed for automobiles, a frame including end rails, sectional side rails, means connecting the side rail sections to fold the latter within the end rails in spaced parallel relation with the sections of one side rail folded within the sections of the other side rail, means to hingedly secure one end of the frame to the running board of an automobile, whereby the frame may be arranged horizontally in extended position to provide a bed, and vertically in folded position to provide a luggage carrier, and means to support the outer end of the bed.

In testimony whereof I affix my signature.

WILLIAM B. VAN WERT.